United States Patent [19]
McGuire

[11] Patent Number: 5,455,857
[45] Date of Patent: Oct. 3, 1995

[54] AUTOMATIC TELEPHONE CALLING CARD

[76] Inventor: Sean McGuire, 10700 College Ave., Kansas City, Mo. 64137

[21] Appl. No.: 33,334

[22] Filed: Mar. 18, 1993

[51] Int. Cl.⁶ .................................................. H03M 1/27
[52] U.S. Cl. .......................... 379/355; 379/354; 379/357; 379/356; 379/112
[58] Field of Search .................................... 379/355, 357, 379/354, 112, 356

[56] References Cited

U.S. PATENT DOCUMENTS

| | | | |
|---|---|---|---|
| 4,126,768 | 11/1978 | Grenzow | 379/357 |
| 4,868,849 | 9/1989 | Tamaoki | 379/355 |
| 4,980,910 | 12/1990 | Oba et al. | 379/355 |
| 4,995,077 | 2/1991 | Malinowski | 379/355 |
| 5,119,414 | 6/1992 | Izumi | 379/357 |

Primary Examiner—Jeffery A. Hofsass
Assistant Examiner—Jacques M. Saint-Surin
Attorney, Agent, or Firm—Kokjer, Kircher, Bowman & Johnson

[57] ABSTRACT

An automated calling card is provided having internal means for generating audible tones representative of a telephone number or calling card number to be dialed. A small, card-shaped unit houses a microprocessor or logic circuitry, including means for inputting data, memory, means for generating tones, a speaker and a display. Telephone numbers and information pertaining thereto can be stored into memory through use of a keypad on the card. A calling card number is also stored in memory. In use, audible tones representative of a telephone and/or calling card number desired to be dialed are generated by the card. Use of a Personal Identification Number prohibits unauthorized access to features of the card.

5 Claims, 4 Drawing Sheets

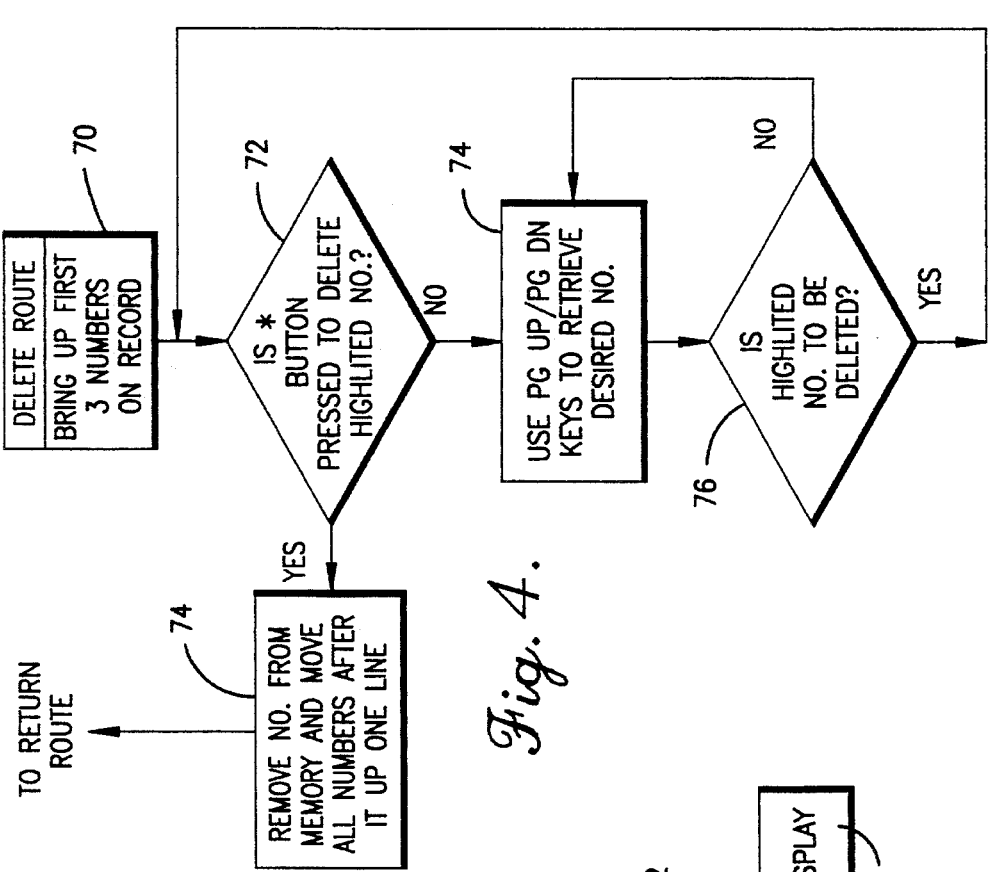
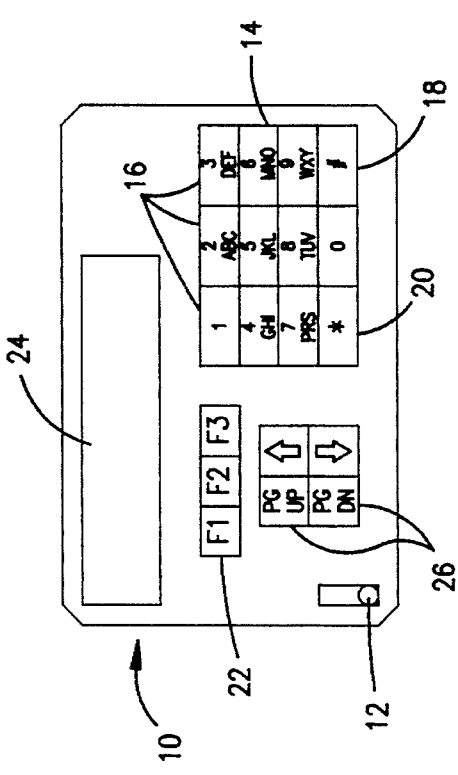
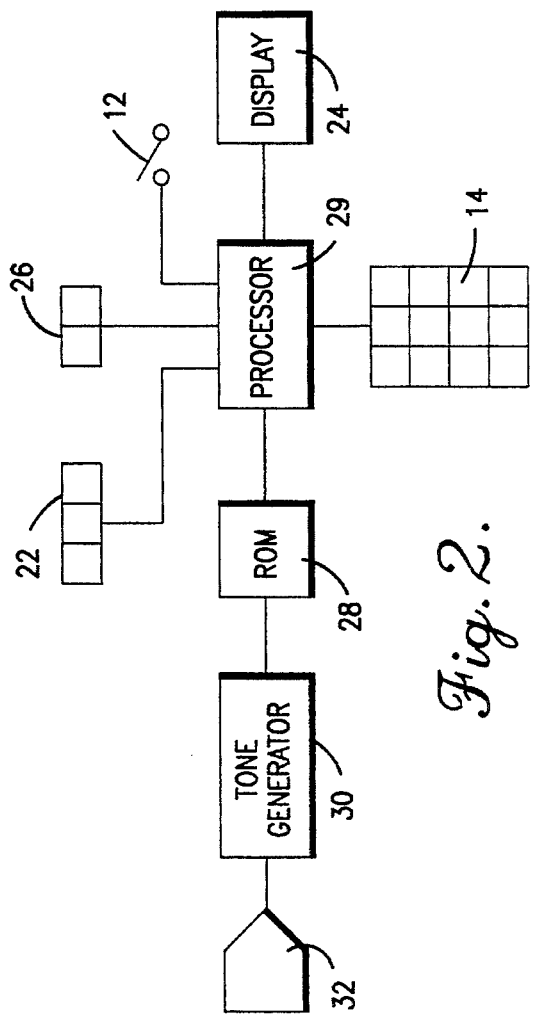

AUTOMATIC TELEPHONE CALLING CARD

BACKGROUND OF THE INVENTION

Field of the Invention

The present invention is generally directed to an automated calling card for assisting the cardholder in placing telephone calls, and more specifically to a card having internal electrical circuitry for generating audible tones representative of tones associated with a telephone number or a calling card number to be dialed.

In recent years, as the telecommunications industry has advanced along with increases in technology, the telephone industry has seen an increase in the use of calling cards. The calling card has a number assigned to the cardholder and permits the cardholder to place telephone calls on credit. However, as the use of calling cards has increased, so has theft of calling card numbers. Thieves have been known to use a variety of unscrupulous methods for stealing calling card numbers and thereafter placing fraudulent phone calls which are credited to the stolen number. For instance, thieves may stand near phone booths in public areas such as airports and the like and eavesdrop on an individual placing a phone call with the intent of over hearing and remembering a calling card number that the phone caller is giving to the telephone operator.

Calling card fraud results in enormous expense to the telephone industry. Much of this expense is passed on to the consumer who is forced to pay higher rates to offset the economical losses associated with calling card fraud.

Modern telephone systems have attempted to overcome the problems of calling card number theft by implementing telephones which permit the caller to dial a calling card number by using the keypad of the telephone. Oftentimes, this is accomplished by the caller lifting the handset and dialing a necessary prefix number prior to dialing a desired telephone number, and then waiting for a tone to sound in the handset. Then, the individual's calling card number can be dialed and the phone call will automatically be billed to the individual named on that calling card number account.

While the foregoing technology defeats the thief who is attempting to overhear a caller giving his calling card number to a telephone operator, it is not been an altogether effective means for overcoming calling card theft. Calling card theft remains a critical problem in the telephone industry as thieves stand near public telephone booths and watch, perhaps aided by binoculars, while individuals type in their calling card numbers with the telephone key pad. Additionally, thieves commonly use video camera recorders aimed at a telephone booth from some remote distance to visually record a caller keying in his or her calling card number.

Some calling cards now utilize a magnetic strip located on the card to store the calling card number. The magnetic strip portion of the card is scanned by a slot-reader on or connected to the telephone. While such a card prevents the cardholder from orally or manually communicating calling card number, only a small percentage of telephones are currently equipped with slot-reading capabilities. Additionally, stolen and lost magnetic cards may still be used by others.

In view of the foregoing problems with calling card theft, telephone callers in public places must be especially careful to speak softly when orally using their calling card number, or to take the precaution to shield the key pad of the telephone from the view of others. Additionally, many calling cards place the calling card number directly on the face of the card. If this number misplaced, lost or stolen, anyone seeing or finding the card could access long distance phone calls on the credit of the cardholder.

U.S. Pat. No. 4,980,910 (Oba et al.), assigned to Sharp Kabushiki Kaisha, Osaka, Japan, discloses a portable automatic dialing unit for overcoming some of the above-identified problems. Particularly disclosed is a device for storing numbers and information, such as the name of a person, associated with each number. In use, the dialing unit can automatically transmit dialing data, such as the telephone number to be called and a calling card number. One practical problem with the device disclosed by the '910 patent is its physical structure, and particularly its cumbersome size. In this regard, the present invention is preferably constructed dimensionally similar to a common credit card. This slim-line embodiment permits the unit to be easily stored in a wallet, purse or pocket. As a result, the unit of the present invention is more convenient and accessible to the user.

The need exists for a telephone calling card that does not require the user to orally or manually through the use of the telephone key pad enter a calling card number. Additionally, the need for a small, convenient-to-use automatic calling card exists. Additionally, the need exists for a calling card that cannot be used without knowledge of the cardholder's Personal Identification Number (PIN), which is required before features of the card can be accessed. The present invention meets these objectives.

SUMMARY OF THE INVENTION

The present invention is an automated calling card which permits a person desiring to place a telephone call to bill the charges for the call to their calling card number without orally telling the telephone operator the number or manually entering the calling card number through the use of the telephone key pad. A plastic card is provided which houses a small microprocessor and a memory for storing information such as telephone numbers, a calling card number, other information relating to the stored numbers or the cardholder, and a PIN of the cardholder. A miniature keypad similar to the keypad on a common telephone is located on the face of the card and connected to the internal circuitry. A display is also located on the face of the card.

The cardholder may use the keypad to enter into memory commonly called or other important telephone numbers. Additionally, for each telephone number entered into the card, a brief description can also be entered into the card in association with that telephone number. Accordingly, once a phone number is entered into the card, it can later be recalled on the display screen of the card along with, for instance, the name of the person associated with that telephone number. The card of the present invention also has editing capabilities for changing or deleting previously entered telephone numbers.

The cardholder's calling card number is also stored into the internal memory. This number could be placed into memory prior to receipt of the card by the cardholder, or could be input into the card through the keypad.

During use of the card, the cardholder can lift the handset of a telephone to obtain a dial tone. At this point, the cardholder can switch on the calling card and in the preferred embodiment, enter a PIN associated only with the cardholder to obtain access to the functions of the card. Use of cursor keys located on the face of the card permit the cardholder to scroll through telephone numbers previously entered into the card. Once the telephone number that is desired to be called is highlighted on the display of the card, the cardholder can place the card up to the mouthpiece of the handset of a telephone and press a selected button on the card. Audible tones representative of that telephone number will be generated and output through a speaker located in the card. These tones are precisely the same tones that would be generated if the caller utilized the keypad of the telephone when making the call.

If the call is desired to be billed to the calling card number and the telephone number dialed by the card included the necessary prefix for making a calling card call, the cardholder may then place the card back to the mouthpiece of the handset of the telephone and press a second selected button causing the card to generate a plurality of audible tones representative of the calling card number of the cardholder. The telephone system will respond to this audible input as if the cardholder had entered the telephone number and calling card number directly into the telephone system through the use of the keypad on the telephone. Accordingly, with the present invention, the cardholder at no point orally communicates his or her calling card number. Additionally, the cardholder is not required to press any buttons on the telephone set. Accordingly, unscrupulous thieves would have no opportunity to steal the calling card number by eavesdropping or spying on the caller.

The electronic components which permit operation of the present invention are housed within a plastic card. Apertures in at least one face of the card receive a display, a keypad, and other functional keys.

It is an object of the present invention to provide a calling card which substantially reduces or prevents calling card number theft.

It is a further object of the present invention to provide a calling card which does not require the cardholder to orally communicate his or her calling card number to the telephone operator.

It is another object of the present invention to provide a calling card which does not require the cardholder to enter his or her card number into the telephone system through the use of the telephone keypad.

It is another object of the present invention to provide a calling card which electronically stores information.

It is yet another object of the present invention to provide a calling card which has a display screen for viewing information stored within the calling.

Anther object of the present invention is to provide a calling card which generates audible tones representative of telephone numbers and a calling card number.

Another object of the present invention is to provide a calling card which requires entry of a personal identification number before the features of the card may be accessed.

Another object of the present invention is to provide an automated calling card having features for editing information electronically stored within the card.

It is another object of the present invention to provide a calling card which will dial a telephone number or a calling card number when the cardholder presses appropriate selected buttons on the card.

It is a primary object of the present invention to provide a calling card for generating audible tones that is a small card-shaped unit which is easily stored in a cardholder's pocket, wallet, or purse.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith, and in which like reference numerals are used to indicate like parts of the various views;

FIG. 1 is a view of the front face of the calling card of the present invention;

FIG. 2 is a block diagram of the internal circuitry of the present invention;

FIGS. 3, 4, 5, and 6 constitute a flow chart detailing operation of the calling card of the present invention;

Figure 3:
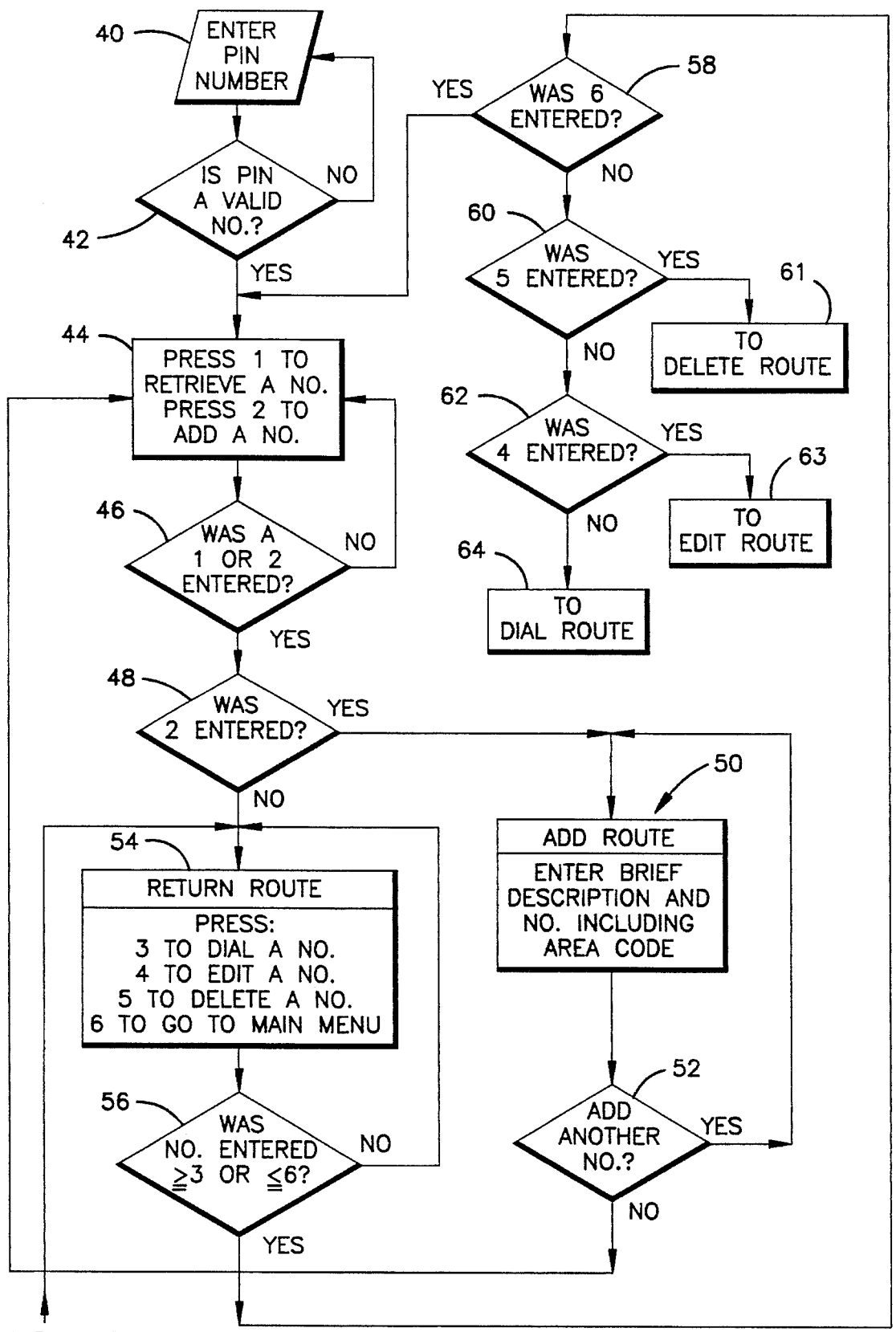
Figure 5:
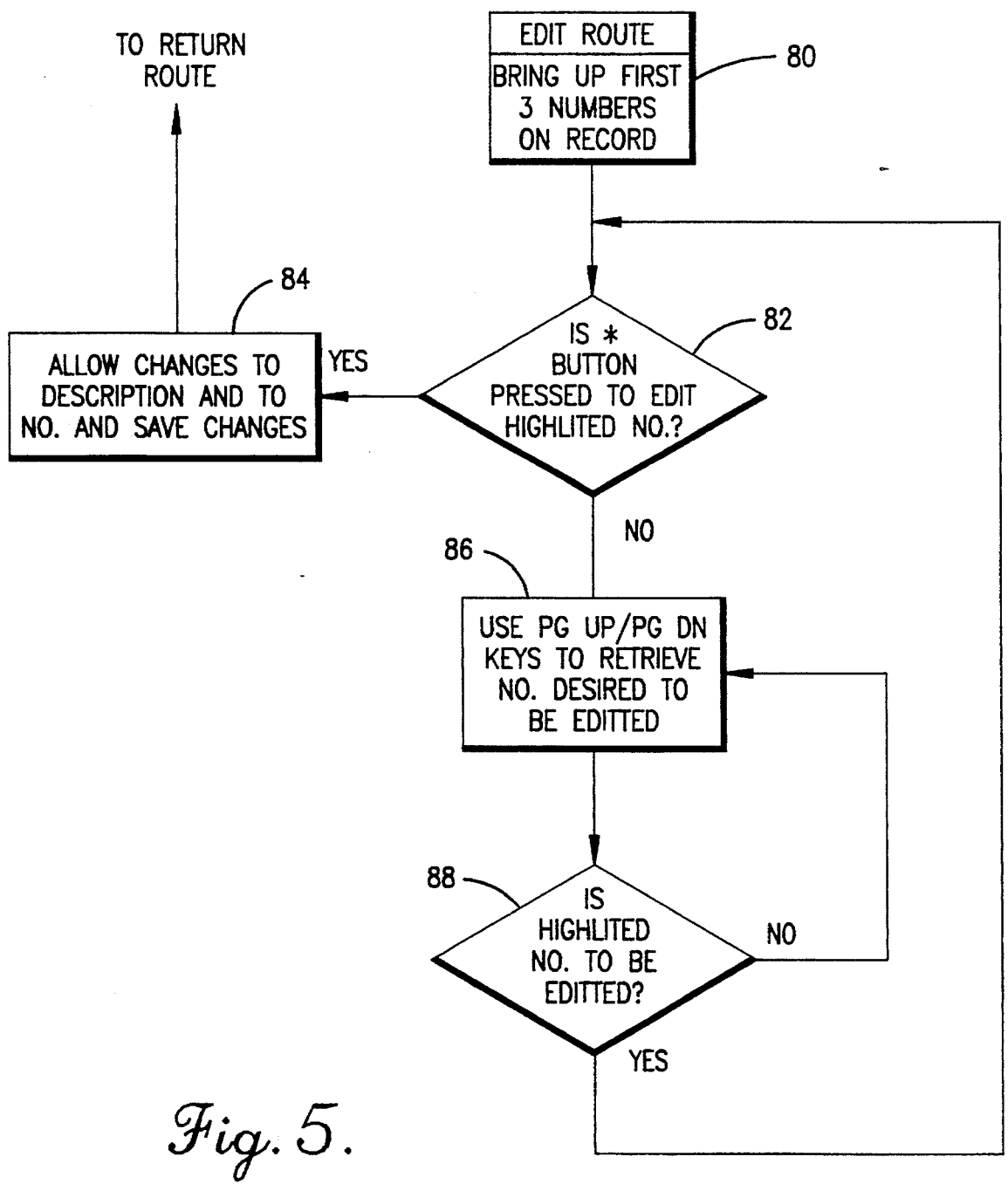
Figure 6:
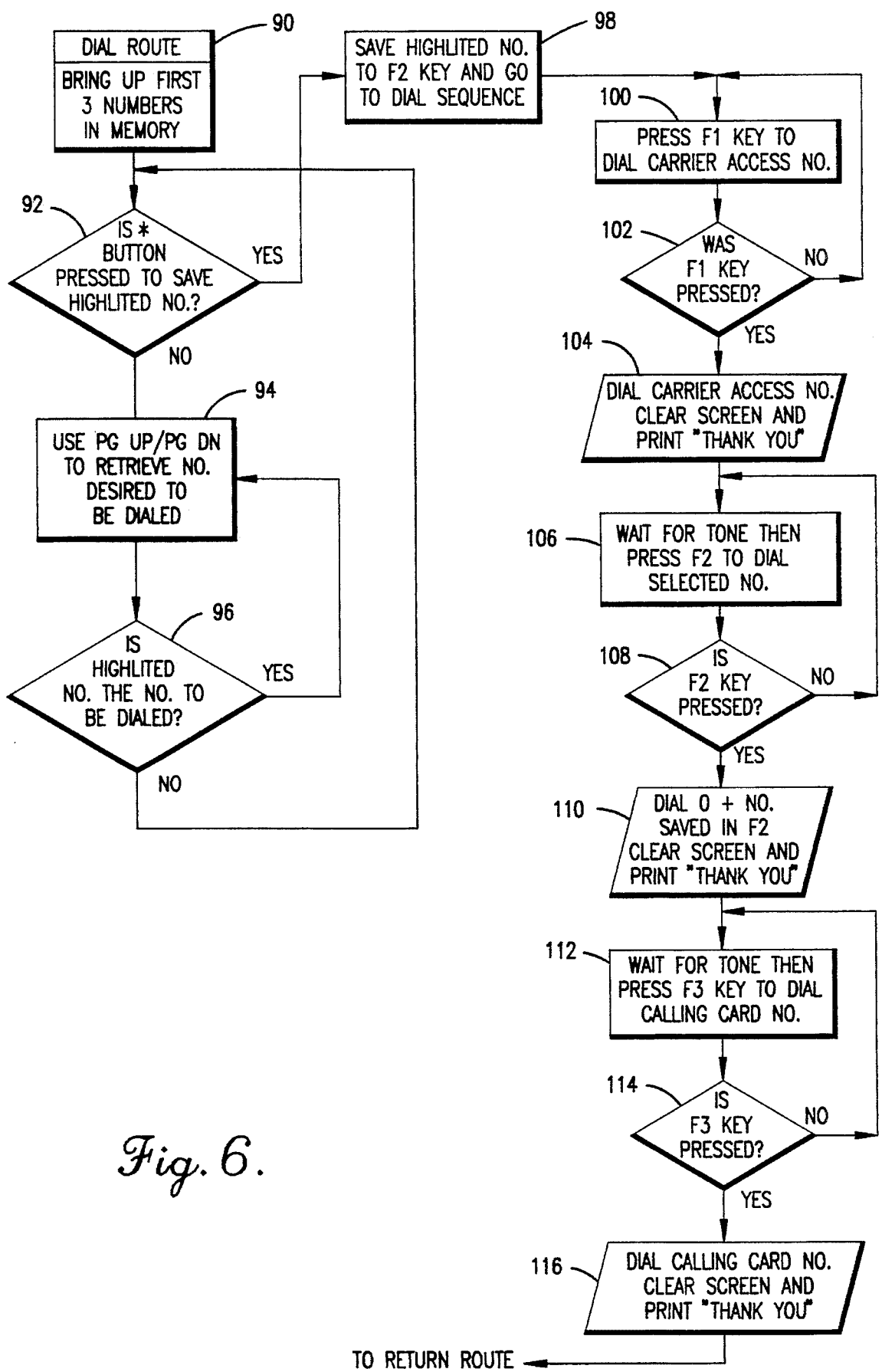

Particularly, FIG. 3 generally shows initialization and selection of features of the calling card of the present invention;

FIG. 4 generally shows a flow chart for deletion of numbers previously entered into the calling card of the present invention;

FIG. 5 generally shows a flow chart for editing numbers previously entered into the present invention; and FIG. 6 shows a flow chart for dialing a telephone number and calling card number stored in the calling card of the present invention.

DETAILED DESCRIPTION OF THE INVENTION

FIG. 1 shows the face of the calling card 10 of the preferred embodiment of the present invention. Card 10 is preferably shaped like a traditional credit, debit, or calling card, although slightly thicker. The casing of card 10 is preferably made of plastic. It should be understood that while the shape of the present invention is not critical, it is important that its overall size remain compact so that card 10 can be easily stored in a wallet, purse, pocket or the like.

The plastic card essentially comprises a housing for electronics located within the card. The card 10 has an aperture in at least one face of the card for receiving components, such as a display, or perhaps buttons or keys, which are connected to the internal electronics. Each face of card 10 is preferably rectangular in shape, while the preferred maximum thickness of card is less than one-quarter of an inch, and even more preferably less than one-eighth of an inch. The face of the card 10 includes an on-off switch 12 for switching on and off the card 10. A keypad 14, preferably similar to a keypad of a common telephone, is also located on the face of the card 10. The keypad 14 preferably includes twelve individual keys 16 representing the numbers 0–9, and a pound key 18 and a star key 20. Preferably, the keys 16 representative of the numbers 2–9 each have on its face three letters of the alphabet. This is similar to the keypad of a common telephone set.

In the preferred embodiment of the present invention, the letter Q, which does not appear on the face of a telephone, is associated with the numeral 7. Similarly, the letter Z, which does not appear on the face of a telephone, is associated with the numeral 9. In this way, all letters of the English alphabet are represented on keypad 14. This permits the cardholder to enter information into card 10 which is associated with an explanatory of a telephone number entered into card 10.

The face of card 10 also includes a number of function keys 22. In the preferred embodiment, three function keys F1, F2, F3 are utilized. The face of card 10 also includes a display screen 24, such as a liquid crystal display (LCD), for displaying telephone numbers and information pertaining thereto that has been stored in card 10. The display screen 24 is preferably a three line display having a highlighting bar (not shown) at the position of the upper most line. Card 10 also includes cursor buttons 26 for scrolling up and down through data stored within card 10. As the cursor buttons 26 are utilized, the information appearing on display screen 24 changes in accordance with which cursor button is being pressed.

FIG. 2 shows a schematic of the preferred internal circuitry of card 10. A processor 29 is connected to on-off switch 12, keypad 14, display 24, function keys 22, Read Only Memory (ROM) 28, and cursor buttons 26. The ROM 28 stores operating software of the present invention, in addition to information entered into card 10 through keypad 14 by the cardholder. It should be understood that the present invention can be constructed using extremely condensed printed circuits for performing the logic described herein.

Calling card 10 specifically contemplates using a menu driven system for assisting the cardholder in placing credit card calls that will not be subject to common forms of phone card fraud.

Initially, the cardholder of calling card 10 must switch on-off switch 12 to the on position to activate card 10. Card 10 is powered by a small battery (not shown) interconnected to the internal circuitry. The switching on of on-off switch 12 electrically connects the battery to the internal circuitry shown in FIG. 2.

It is preferred that the phone card of the present invention utilize a personal identification number (PIN) assigned to the cardholder for assisting in the prevention of unauthorized access to the card. It is particularly contemplated that the purchaser of the calling card 10 of the present invention will receive the card prior to receiving an assigned PIN number. The PIN number will already be stored in ROM 28, and the card holder will be required to use keypad 14 to enter in his or her assigned number before the card can be used to store, edit, or delete phone numbers or generate tones for dialing. Alternatively, card 10 can be designed to permit the cardholder to choose and enter his or her own PIN, if desired.

In the preferred embodiment of the present invention, once the card is turned on with on-off switch 12, and a valid PIN is entered through keypad 14, a main menu appears on display screen 24. Preferably, the cardholder is prompted to press the numeral 1 on the keypad to retrieve a number, or to press the numeral 2 to add a telephone number. If a telephone number is to be added to the memory 28 of card, the number 2 in this example is pressed and the cardholder can enter in a phone number and a brief description relating to that number by using keypad 14. The telephone number is entered using keys 16.

Information relating to that telephone number can be entered by first pressing a selected button, for instance the pound button, to access the alphabetic capabilities of keys 16. In this regard, if the name "Tom" is to be associated with a particular phone number, the pound button may be pressed, followed by pressing the key bearing the numeral 8 which will cause a "T" to be displayed on display screen 24. The pound button can be pressed again which will move a cursor on display screen 24 one position to the right. At this point, the key 16 bearing the numeral 6 may be pressed 3 times to display an "O" on display screen 24. Once again, the pound key is pressed, the cursor key shifts one position to the right, and the numeral 6 may be pressed one time to display an "M". At this point, if the number and any identifier displayed on the screen are correct, the star key may be pressed to store the displayed information into internal memory 28.

The process of adding numbers to internal memory 28 can be repeated to add other numbers. In the preferred embodiment, the numbers are stored in memory 28 in stack format. Accordingly, the first number to be entered into memory 28 will be the last number that would be displayed on display screen 24 when retrieving numbers. In other words, to retrieve the first number stored in memory 28, the cursor buttons 26 would be used to scroll down to the bottom to access that number. It should be understood that any type of logic may be used for arranging or sorting the numbers stored in memory 28. For instance, the numbers could be automatically arranged in alphabetical order for displaying on display screen 24.

The main menu can also be used to retrieve a number previously stored in internal memory 28. By pressing the key 16 bearing the numeral 1 when viewing the main menu, the cardholder will access the stored telephone numbers. Preferably, display screen 24 is a three line display, and accordingly, three telephone numbers along with their respective associated identification information will be displayed. The top line of the display is preferably highlighted. The cursor buttons 26 may then be used to scroll up and down through the stored telephone numbers. In this regard, it is to be understood that card 10 can be constructed to permit the cursor buttons 26 to move the highlighted position up and down on display 24. Once the telephone number desired to be retrieved is located in the highlighted position, that number may be dialed, deleted, or edited.

Preferably, when the main menu is used to select retrieval of a stored telephone number, a sub-menu then appears on display screen 24 which prompts the cardholder to select an appropriate numeral on keypad 14 for dialing the number, editing the number, or deleting the number. If the deletion choice is made, the star button may then be pressed to delete the highlighted number from memory.

If the editing choice is made, the star button may again be pressed to delete the stored information, but keypad 16 may then be used to re-enter the edited information into the same memory location. It should be understood that editing stored information can be accomplished in other ways. For instance, cursor control keys could be provided to permit movement of the cursor to various positions on the display screen where editing is desired.

If a retrieved number is desired to be dialed, the dialing feature is selected at the sub-menu. The cardholder can pick up the telephone handset and place card 10 so that the speaker 32 is flush against the mouthpiece of the telephone. At this point, as discussed below, the function keys F1, F2, F3 are used to dial the appropriate access code for the issuer of the calling card number being used, the telephone number to be dialed, and the calling card number.

In the telephone industry, different long distance carriers have different access codes to access their long distance service. Accordingly, since the cardholder of the card 10 will have a calling card number issued from a particular telephone company, it will be necessary for the cardholder to access his or her telephone company's services before placing a phone call. It is preferred with the present invention to associate the access code of a particular telephone company with the function key F1 of card 10 of the present invention. This way, with the speaker 32 flush against the mouth piece of the telephone handset, the F1 key may be pressed. Tone generator 30 will generate audible tones representative of the tones made by a telephone when the keypad of the telephone is utilized to dial in a number. Next, the cardholder can press the function button F2 for dialing the highlighted telephone number. After the appropriate signal from the telephone that the number to be dialed has been received, usually a tone, the function button F3 can be pressed to dial the calling card number. Pressing of the function buttons F2 and F3 will cause tone generator 30 to generate the telephone to be dialed and the calling card number, respectively.

Referring now to FIGS. 3–6, a flow chart of the preferred operation of the present invention is shown and use of the card 10 is described in greater detail. As shown in FIG. 3, after card 10 is switched on with on-off switch 12, the cardholder enters a PIN at step 40. As shown at step 42, if the PIN entered is not a valid number, the functions of card 10 will not be accessed. If the PIN entered is a valid number, a main menu appears as shown at step 44.

At step 44, the preferred embodiment of the present invention permits the cardholder to press the numeral 1 on keypad 16 to retrieve a telephone number stored in memory, or to press a 2 to add a telephone number to memory. As shown at step 46, either the numeral 1 or 2 must be entered before proceeding. As shown at step 48, if a 2 was entered, the logic of the present invention proceeds to a sub-routine labeled herein as ADD ROUTE to permit the cardholder to add a telephone number to memory. If a 2 was not entered, a 1 must have been entered and the logic of the present invention proceeds to a sub-routine labeled herein as RETURN ROOT.

Referring now to the ADD ROUTE sub-routine beginning at step 50, the cardholder can enter a telephone number and brief description of that number into the internal memory of card 10. This is accomplished as set forth above by using keypad 14. As shown in step 52, additional numbers can be added if desired. Once all of the numbers desired to be entered into card 10 have been added, the system can be returned to the main menu, preferably by pressing the key 16 bearing the numeral 2.

Returning back to step 48, and assuming the numeral 1 was entered, the RETURN ROUTE sub-routine will now be described. When a 1 is entered at the main menu, a sub-menu appears as shown in a representative fashion at step 54 which prompts the cardholder to use the dialing feature of the present invention by pressing the numeral 3, to edit a telephone number stored in memory by pressing the numeral 4, to delete a telephone number by pressing the numeral 5, or to go to the main menu by pressing the numeral 6. As shown at step 56, when an appropriate number is entered, the logic of the present invention determines whether a 3, 4, 5, or 6 was entered. As shown in step 58, if a six was entered, the system returns to the main menu. If the numeral 6 was not entered, the logic of the present invention asks at step 60 whether a 5 was entered. If a 5 was entered, the logic is directed to a sub-routine DELETE ROUTE for deleting a telephone number, as shown by reference numeral 61 of FIG. 3. If a 5 was not entered, the logic of the present invention asks at step 62 whether a 4 was entered. If a 4 was entered, the logic is directed to a sub-routine EDIT ROUTE for editing a telephone number stored in memory, as shown by reference numeral 63 in FIG. 3. If a 4 was not entered, then a 3 must have been entered, and the logic is directed to a sub-routine DIAL ROUTE for dialing a telephone number stored in memory, as shown by numeral 64 of FIG. 3.

Referring now to FIG. 4, it is assumed that a 5 was entered at step 54, and the cardholder is desiring to delete a number previously stored in memory 28. This is accomplished by the subroutine DELETE ROUTE. As shown at step 70 of FIG. 4, the first three numbers on record of memory 28 are displayed on display screen 24. The top line of the display screen is preferably highlighted. As shown at step 72, the star button may be pressed to delete the highlighted number. As shown at step 74, if the star button is pressed, the highlighted number is removed from memory and all of the numbers stored after the deleted number move up one line on display screen 24.

As shown at step 74, if the star button is not pressed to delete the highlighted number, the cursor buttons 26 may be used to scroll up and down through the stored numbers to retrieve the number desired to be deleted. As shown at step 76, once the number that is desired to be deleted is highlighted, the star button can be pressed to delete the highlighted number.

Referring now to FIG. 5, the sub-routine EDIT ROUTE for editing a number stored in memory is described. As shown at step 80, if the numeral 4 is chosen at step 54 of FIG. 3 indicating that a number stored in memory is desired to be edited, the first three numbers stored in memory 28 are displayed on display screen 24. As shown at steps 82 and 84, if the star button is pressed, the highlighted number can be edited using keypad 14. As shown at step 86, if the star button is not pressed, the cursor buttons may be used to scroll up and down through the stored numbers to retrieve the number desired to be edited. As shown at step 88, once the number that is highlighted is the number that is desired to be edited, the star button may be pressed (at step 82) for editing the highlight number.

Referring now to FIG. 6, the sub-routine DIAL ROUTE for dialing a telephone number and calling card number is described. When the selection is made at step 54 of FIG. 3 to dial a telephone number, the DIAL ROUTE sub-routine displays the first three numbers stored in memory 28 on display screen 24 as indicated by reference numeral 90. As shown at steps 92, 94, and 96, the star button is pressed to save the highlighted number to be dialed once the number to be dialed is retrieved within the highlighted position of display screen 24. As shown at step 98, the highlighted number is preferably saved to a memory location accessible by pressing function key F2.

At this point during operation of the present invention, the card 10, and particularly the speaker 32, is placed to the mouthpiece of a telephone handset that has been taken off-hook. As shown at step 100, the function key F1 is pressed to dial the access number of the long distance carrier utilized by the cardholder. As shown at steps 102 and 104, when the function key F1 is pressed, the logic of the present invention causes tone generator 30 to dial the access number. Upon completion of the dialing, the display screen will be cleared and a message to indicate that dialing is completed, such as "thank you", is displayed. As shown in step 106, after the access code is dialed, the function key F2 is pressed to dial the selected telephone number. Depending upon the long distance system being used, it may be necessary to listen for a tone over the telephone prior to dialing the telephone number. As shown at steps 108 and 110, once the F2 key is pressed, the logic of the present invention will automatically dial a 0 (zero) and then the numbers saved at F2. It should be understood that the dialing of the 0 is in accordance with current telephone practice in the United States which requires that a 0 be dialed prior to dialing a telephone number if a calling card call is to be made. Understandably, this logic could be altered to meet the specifications of other telephone systems. When the F2 button is pressed, the tone generator 30 will generate a plurality of tones to dial the telephone number. Once the telephone number has been dialed the logic will clear display screen 24 and print a message which indicates that the number has been dialed, such as "thank you."

As shown at step 112, once the telephone system indicates to the cardholder that the number has been dialed and that a calling card number may be entered, the function key F3 is pressed to dial the cardholder's calling card number. The cardholder's calling card number has previously been stored in memory and assigned to the function key F3. As shown at steps 114 and 116, once the function key F3 is pressed, the logic of the present invention will dial the calling card number by causing tone generator 30 to generate a plurality of tones representative of the calling card number. Once the calling card number has been dialed, the logic of the present invention will clear display screen 24 and print a message indicating that dialing is complete, such as "thank you."

As shown in FIGS. 3–6, once a particular sub-routine has been completed, the logic of the present invention is directed back to subroutine RETURN ROOT which corresponds with reference numeral 54 of FIG. 3.

From the foregoing it will be seen that this invention is one well adapted to attain all ends and objects here and above set forth together with the other advantages which are obvious and which are inherent to the structure.

It will be understood that certain features and sub-combinations are of utility and may be employed without reference to other features and sub-combinations. This is contemplated by and within the scope of the claims.

Since many possible embodiments may be made of the invention without departing from the scope thereof, it is to be understood that all matter herein set forth and shown in the accompanying drawings is to be interpreted as illustrative and not in a limiting sense.

What is claimed is:

1. A portable unit for use with a telephone, said portable unit comprising:

a processor;

a memory connected to said processor;

a keypad, connected with said processor, for inputting into said memory alpha-numerical data, including numerical data representative of a plurality of telephone numbers to be dialed, numerical data representative of a calling card number to be dialed, and alphabetic data relating to each said telephone number to be dialed;

a display, connected to said processor, for visually displaying said numerical and alphabetic data;

a substantially flat plastic card for housing said processor, said memory, said keypad and said display, said plastic card including at least one aperture therein, wherein said display is positioned within said plastic card in association with said aperture, thereby making said display visually accessible at the exterior of said plastic card;

first and second function keys, located remotely from said keypad, each said function key connected with said processor and accessible at the exterior of said plastic card, wherein said data representative of said calling card number is associated with said second function key, and wherein said processor includes means for selecting one of said telephone numbers to be dialed and means for associating said numerical data representative thereof with said first function key;

means for converting said data representative of said calling card number and said selected telephone number to be dialed into a stream of audible frequency output signals; and a speaker, connected with said converting means, wherein depressing said first function key activates said converting means to output through said speaker a stream of audible frequency output signals representative of said telephone number to be dialed, and wherein depressing said second function key activates said converting means to output through said speaker a stream of audible frequency output signals representative of said calling card number.

2. The portable unit, according to claim 1, wherein said memory further contains data representative of an access code of a long distance telephone carrier, said portable unit further comprising a third function key, located remotely from said keypad, wherein depressing said third function key activates said converting means to output through said speaker a stream of audible frequency output signals representative of said access code.

3. The portable unit, according to claim 2, wherein said display simultaneously displays data of at least two telephone numbers and wherein said processor includes means for associating a selected one of said telephone numbers displayed with said first function key.

4. The portable unit, according to claim 3, wherein said means for associating a selected one of said numbers with said first function key includes means for scrolling through said data representative of said telephone numbers stored in said memory.

5. The portable unit, according to claim 1, said portable unit further comprising:

means for storing, in said memory, data indicative of instructions to the user, and wherein said keypad is operable for inputting commands to said processor; and said processor including means for analyzing said commands and means for retrieving from said data indicative of instructions to the user data that is responsive to said command, and wherein said processor further includes means to route said responsive data, indicative of said instructions, to said display.

* * * * *